United States Patent [19]

Guglielmo, Sr.

[11] 4,393,102

[45] Jul. 12, 1983

[54] NET FINISHING COMPOSITION AND PROCESS FOR USING SAME

[76] Inventor: Richard J. Guglielmo, Sr., 140 Walnut St., Northvale, N.J. 07647

[21] Appl. No.: 888,373

[22] Filed: Mar. 20, 1978

[51] Int. Cl.$^3$ .................. B05D 5/00; B05D 1/18; C08K 5/07; C08L 27/06

[52] U.S. Cl. ..................... 427/243; 427/393.4; 427/393.5; 427/430.1; 524/364; 524/563; 524/568

[58] Field of Search ............... 427/243, 385 B, 430 R, 427/390 E, 393.4, 393.5, 430.1; 428/255, 395; 260/31.6, 31.8 G, 31.8 R, 32.8 R; 252/8.6; 87/1; 524/364, 563, 568

[56] References Cited

U.S. PATENT DOCUMENTS

| | | | |
|---|---|---|---|
| 2,431,078 | 11/1947 | Powell et al. | 260/31.8 G |
| 2,517,646 | 8/1950 | Ewing | 427/243 |
| 3,305,602 | 2/1967 | Bromstead | 260/32.8 R X |

FOREIGN PATENT DOCUMENTS 73193 of 1970 German Democratic Rep. .......................... 427/243 U X

OTHER PUBLICATIONS

Booth, George L., *Coating Equipment and Processes*, Lockwood Publishing Co., Inc., 1970, pp. 18–41.

*Primary Examiner*—Evan K. Lawrence
*Attorney, Agent, or Firm*—Louis E. Marn; Elliot M. Olstein

[57] ABSTRACT

There is disclosed a net finishing process and composition for treating a net, such as a fishing net formed of synthetic material, to form a flexible film thereon. The net finishing composition is comprised of a low molecular weight, high acetate content, vinyl chloride-vinyl acetate copolymer resin, a monomeric plasticizer and a polymeric plasticizer dissolved in a solvent system.

14 Claims, No Drawings

NET FINISHING COMPOSITION AND PROCESS FOR USING SAME

This invention relates to a composition of matter and a process for using same, and more particularly to a net finishing composition for treating nets.

BACKGROUND OF THE INVENTION

Nets, such as fish nets, have from time inmemorial been made from natural fibers and have been treated with tar or tar-like materials to protect and enhance the properties thereof. Synthetic materials, such as nylon, polyesters, polypropylene, polyethylene and the like are replacing such natural fibers with nylon presently being in greater demand as a result of the many excellent properties as well as cost considerations.

Nylon, i.e., the monofilament fiber thereof, is woven to form a twine which is subsequently further woven to form the desired mesh size of the net. To protect the thus formed nylon net or the like, such a net has been treated with tar and variations of such natural like materials, much as the natural fiber nets have been treated over the centuries, as well as being treated with various synthetic materials. Such treatments have been found to be relatively ineffective with the resulting coatings or films readily washing off or wearing off the manufactured net. With such washing out or wearing out, exposure of the synthetic material to the elements has caused early breakdown of the net resulting in the surveying thereof or at best retreatment thereof.

As hereinbefore mentioned, nylon has found the greatest use in the fish net industry as compared with other synthetics due to its many excellent properties as well as present cost factors, however, nylon has been found to absorb as much as 20% by weight of its weight in water with concomitant loss in fiber strength.

In the manufacture of nets, whether the nets are to be used in sporting events, such as tennis, ping-pong or the like, or as fishing nets, the mesh sizes thereof are set by usage or by governmental regulations. In particularly, the fishing industry, the net mesh size is carefully regulated by the Federal Government, i.e., mesh size is dictated by the type of fish being subjected to trawling. While use of nylon nets have increased the lifetime of net usage as distinguished from natural fiber nets coated with tar or tar like substances, the usage lifetime is still relatively short.

OBJECTS OF THE INVENTION

An object of the present invention is to provide a novel composition of matter for treating a net to substantially enhance the useful life cycle thereof.

Another object of the present invention is to provide a novel composition of matter for treating nets in a facile manner.

Still another object of the present invention is to provide a process for treating a net to produce a finished net of enhanced useful like cycle.

SUMMARY OF THE INVENTION

These and other objects of the present invention are achieved by a net finishing composition and process for using same wherein the net finishing composition is applied by dipping the net mesh substrate into such composition and which is comprised of a low molecular weight, high acetate content, vinyl chloride vinyl acetate copolymer, a monomeric plasticizer, a polymeric plasticizer dissolved in a solvent system. The plasticizers are present in an amount of from 40 to 60 parts, preferably 50 parts per 100 parts of the copolymer with the ratio of monomeric plasticizer to polymeric plasticizer ranging from about 1 part to 1 part to about 3 parts to 1 part, preferably 2 parts to 1. The solvent system includes ketones and aliphatic and/or aromatic diluents in the range of from 75 to 25 to 25 to 75 parts. In one embodiment of the present invention a net finishing concentrate is provided wherein the copolymer and plasticizers are dissolved in a solvent system consisting essentially of ketones for subsequent dilution in a further solvent for the treatment of the net.

DETAILED DESCRIPTION OF THE PRESENT INVENTION

Further objects of the present invention will be had from the following detailed description thereof. While the net finishing composition of the present invention has been used primarily to treat nets used in salt water finishing of menhaden, it is understood that tuna nets, shrimp nets, anchovie nets, etc. may be similarly treated, as well as netting for sporting games, such as tennis.

The net finishing composition of the present invention applied to the net substrates exhibits many properties similar to the properties of the tars as well as many properties superior to the properties of tar used to treat natural fiber nets. In this regard, the resulting net exhibits low physical properties, i.e., low psig with high elongations. Use of a carbon black pigment has significantly aided in psychological acceptance of the resulting net.

The essential components of the resin system of the present invention are the low molecular weight, high acetate content, vinyl chloride vinyl acetate copolymers and the monomeric and polymeric plasticizers. The amount of plasticizers added to the low molecular weight, high acetate content, vinyl chloride vinyl acetate copolymer is of from about 40 to 60 parts, preferably about 50 parts to 100 parts of the copolymer resin. The ratio of the monomeric plasticizer to polymeric plasticizers is from about 1:1 to about 3:1, preferably about 2:1.

The resin system is dissolved in a solvent system such that the solids content of the resulting composition of matter is no less than about 20% by weight, and between about 20 to about 40% solids, with a preferable solids range of about 27 to 28% by weight.

A solvent system includes ketones and aliphatic aromatic hydrocarbons wherein the ratio of ketones to aliphatic and/or aromatic diluents are from 25 to 75 to 75 parts to 25 parts with a preferred range of 50 parts of ketones to 50 parts of the aliphatic and/or aromatic diluents. It will be understood by one skilled in the art that an increase in the aliphatic and/or aromatic diluents to ketones would be more economically attractive, as well as, result in a product which more closely resembles a tar coating, although higher concentrations of such aliphatic aromatic result in lower solids content in the net finishing composition.

While the actual mechanism of the present invention is not clearly understood, it is believed that the net finishing composition of the present invention results from the viscosity and slow drying time of the net finishing composition which permits penetration and monofilament coating of the individual fibers of the woven net, and that penetration and coating continues during drying for a time period substantially greater than the synthetic net finishing compositions heretofore tried in the art which normally results in casting as hereinafter more fully discussed.

Of the low molecular weight, high acetate content, vinyl chloride copolymers, I have found that the acetate content should not be less than about 10% by weight and preferably between 15 to 20% by weight of the copolymer resin. The molecular weight of the copolymer should be in the range of from about 20,000 to about 65,000 with lower acetate content being associated with the higher molecular weights.

In some formulations, pigments have been added for color effect. I have found that carbon black has demonstrated excellent re-inforcing properties as well as resulting in a net which is colored similar to the nets used for years in the industry, i.e., psychological acceptance.

As hereinabove mentioned, due to shipping cost considerations, concentrates of net finishing compositions may be prepared and shipped which only require the addition of diluent solvents at the user site. In this regard, the hereinabove discussed resin system is preferably admixed with 100% ketones to form a 45 to 55% (e.g. 50 percent) by weight solids solution which solids solution is subsequently diluted by adding any conventional aliphatic and/or aromatic hydrocarbons to achieve proper solids content (20%-40%) prior to net treating.

Of the monomeric plasticizers, of which there are many, I have found D.O.D.P. (dioctyl diphthalate) to be particularly usefully advantageous (cost) in the resin system of the present invention. Of the polymeric plasticizers, of which there are many in the art, all the primary polymeric plasticizers have been found useful in the net finishing composition of the present invention.

The net finishing composition of the present invention has been found to be particularly useful, has hereinabove discussed, in the treatment of nylon netting for salt water usage, and in this regard, the composition of the present invention permits a one-step treatment of the netting. Net treatment is effected by placing the net finishing composition, (or properly solventized concentrate) at ambient temperatures in a trough and continuously introducing and withdrawing width-wise the net in total immersion in the net finishing solution for a time of from 5 to 10 seconds. The net generally dries to the touch in about 1 to 2 hours. It is generally desirable to permit the coated net to cure for at least 72 hours before fishing. It will be appreciated by one skilled in the art that fish nets are of considerable weight and length and are not readily handled. Consequently, substantial savings in net handling result through the use of the present invention in that one-step treatment with the composition of the present invention may be effected rather than a double or thrice-through treatment observed to be required when using high molecular weight, high acetate content, vinyl chloride vinyl acetate copolymers whereby minimum solids pickup of from 20 to 25% is required. It has been additionally found that the use of high molecular weight, high acetate content resins require substantial thinning or dissolution to obtain the required penetration and thereby requires double or triple dipping of the net. Additionally, double or triple dipping of the net with high molecular weight copolymer essentially results in a casting of the material rather than penetration thereby substantially increasing the possibility of peeling of the resulting film through handling and abrasion.

It has been found that a nylon net treated with the net finishing composition of the present invention results in a coated nylon net of significantly increased strength properties, e.g., up to 25% stronger than a nylon net alone or nylon net treated with tar or tar-like materials. Additionally, it has been found that the resulting coating or film of the present invention substantially reduces water penetration into the nylon filaments and thereby significantly reduces nylon stretching whereby mesh size will remain substantially constant during the fishing season. Thus, the use of nylon nets treated in accordance with the present invention as compared with nylon nets tar treated in accordance with the present art practice has resulted in an increase of a fish catch of as great as 50% due to the substantial maintanence of the mesh size.

EXAMPLE OF THE INVENTION

The following example is illustrative of the present invention:

EXAMPLE

A nylon fish net is introduced into a net finishing solution of the following components:

| INGREDIENTS | PARTS |
| --- | --- |
| Low molecular weight, high acetate content, vinyl copolymer - *VC113 | 100 |
| Monomeric plasticizer (D.O.D.P.) | 33 |
| Polymeric plasticizer | 17 |
| Methyl isobutyl ketone } Solvent System | 175 |
| Hydrocarbon adherent | 175 |

*Registered Trademark of the Borden Company.

The treated net is removed from the net finishing composition and is permitted to dry for a period of about three days. Thereafter the net is onloaded to a fishing trawler of a fleet thereof and is found to substantially improve daily catch and in some instances by as much as 50% when compared with nylon nets treated with tar-like materials on trawlers in the same fleet.

Fouling of nets with organism, such as barnacle-type organism have been an additional problem. I have found that by adding from 6–15 oz. per gallon to the net finishing composition of a series of organo tin esters (including n-tributyl tin succinate, benzoate and linoleate) and quartenary ammonium salts dissolved in a solvent system, significant anti-fouling effects have resulted.

While the present invention has been described with reference to the treatment of nylon fish nets of a mesh size for menhaden fishing, it will be appreciated that mesh sizes, as well as length sizes of the fish net are not relavent to the present invention except as to sufficient contact time between the composition and net being treated. Additionally, while the net material being treated in accordance with the present invention has found use in salt water fishing, it will be appreciated that nets treated in accordance with the present invention for fresh water fishing would similarly benefit, as well as the fact that any form of nylon netting or like synthetic fiber netting, as well as natural fibers could benefit from the use of the present invention. Additionally, other vinyl chloride copolymers could be used, e.g., a vinylidine vinyl chloride. Generally, the use of other copolymers is not contingent on utility thereof but is really based upon economics, i.e., other known vinyl chloride copolymers are generally too expensive for such a usage.

What is claimed:

1. A concentrate solution for preparing a net finishing solution for treating a net substrate to improve the physical properties thereof which comprises:

a solution of a low molecular weight, high acetate content, vinyl chloride-vinyl acetate copolymer; a monomeric plasticizer and a polymeric plasticizer in a solvent system, said copolymer having a molecular weight of from 20,000 to 65,000 and having an acetate content of from about 10 to about 20 percent by weight, said monomeric and polymeric plasticizers being present in an amount of from about 40 to 60 parts per 100 parts of said copolymer, the ratio of said monomeric plasticizer to said polymeric plasticizer being in the range of from 1:1 to 3:1, said solvent system being present in an amount to effect a solids content of said concentrate solution of between about 45 to 55 percent by weight.

2. A net finishing solution for treating a net substrate formed of a synthetic material to improve the physical properties thereof which comprises:

a low molecular weight, high acetate content, vinyl chloride-vinyl acetate copolymer; a monomeric plasticizer and a polymeric plasticizer in a solvent system, said copolymer having a molecular weight of from 20,000 to 65,000 and having an acetate content of from about 10 to about 20 percent by weight, said monomeric and polymeric plasticizers being present in an amount of from about 40 to 60 parts per 100 parts of said copolymer, the ratio of said monomeric plasticizer to said polymeric plasticizer being in the range of from 1:1 to 3:1, said solvent system being present in an amount to provide a solids content of from 20 to about 40 percent by weight of the net finishing solution.

3. The net finishing solution as defined in claim 2 wherein said solvent system is comprised of a ketone and an aromatic and/or aliphatic diluent in a ratio of from 25 to 75 to about 75 to 25 parts.

4. The concentrate solution as defined in claim 1 wherein said solvent system consists essentially of ketones and said concentrate has a solids content of about 50 percent by weight.

5. The net finishing solution as defined in claim 2 wherein a vinylidene chloride-vinyl chloride copolymer is substituted for said low molecular weight, high acetate content vinyl chloride-vinyl acetate copolymer.

6. The net finishing solution as defined in claim 2 wherein a pigment is added to said solution.

7. The net finishing solution as defined in claim 6 wherein said pigment is carbon black.

8. The net finishing solution as defined in claim 2 wherein an anti-fouling agent is added to said net finishing solution.

9. A process for treating a net substrate formed of a synthetic material to improve the physical properties thereof, which comprises:

(a) coating said net substrate with a net finishing solution comprised of a low molecular weight, high acetate content vinyl chloride-vinyl acetate copolymer, a monomeric plasticizer and a polymeric plasticizer in a solvent system, said copolymer having a molecular weight of from 20,000 to 65,000 and having an acetate content of from about 10 to about 20 percent by weight, said monomeric and polymeric plasticizers being present in an amount of from about 40 to 60 parts per 100 parts of said copolymer, the ratio of said monomeric plasticizer to said polymeric plasticizer being in range of from 1:1 to 3:1, said solvent system including ketones and being present in an amount to result in a solids content of from 20 to 40 percent by weight of said net finishing solutions; and (b) drying said coated net substrate.

10. The process as defined in claim 9 wherein said net substrate is formed of nylon filaments.

11. The process as defined in claim 10 wherein said solvent system includes aliphatic and/or aromatic diluents and in a ratio to said ketones of from about 75 to 25 parts to about 25 to 75 parts.

12. The process as defined in claim 11 wherein the ratio of ketones to aliphatic and/or aromatic diluents is about 50 parts to 50 parts.

13. The process as defined in claim 9 wherein said solids content of said net finishing solution is about 28 percent by weight.

14. The process as defined in claim 9 wherein said net substrate is a nylon fishing net and is dried under ambient conditions prior to fishing.

* * * * *